(12) United States Patent
Wyers

(10) Patent No.: US 6,672,115 B2
(45) Date of Patent: Jan. 6, 2004

(54) LOCKING DEVICE WITH CONVERTIBLE SHANK

(76) Inventor: Philip W. Wyers, 6476 S. Ivy Ct., Englewood, CO (US) 80111

( * ) Notice: Subject to any disclaimer, the term of this patent is extended or adjusted under 35 U.S.C. 154(b) by 0 days.

(21) Appl. No.: 09/556,637

(22) Filed: Apr. 24, 2000

(65) Prior Publication Data

US 2002/0073746 A1 Jun. 20, 2002

(51) Int. Cl.$^7$ ............................................. E05B 67/36
(52) U.S. Cl. ........................... 70/14; 70/34; 70/258; 70/374; 70/381; 70/461; 411/383; 411/546; 280/506
(58) Field of Search .................... 70/14, 34, 461, 70/374, 381, 370, DIG. 57, 258, 232, 386, 229, 466; 411/546, 383, 384; 280/506, 507

(56) References Cited

U.S. PATENT DOCUMENTS

| | | | |
|---|---|---|---|
| 800,648 A | * 10/1905 | Higinbotham | |
| 2,677,261 A | 5/1954 | Jacobi | ............................ 70/14 |
| 3,785,670 A | * 1/1974 | Smith | ....................... 70/230 X |
| 3,798,934 A | 3/1974 | Wright et al. | ................... 70/59 |
| 4,236,395 A | 12/1980 | Avaiusini | ........................ 70/34 |
| 4,435,100 A | * 3/1984 | Cox | ............................. 403/27 |
| 4,576,021 A | 3/1986 | Holden | ........................... 70/34 |
| 4,619,122 A | 10/1986 | Simpson | ........................ 70/34 |
| 4,637,234 A | 1/1987 | Mielonen | ....................... 70/34 |
| 4,711,106 A | 12/1987 | Johnson | ........................ 70/34 |
| 4,844,498 A | * 7/1989 | Kerins et al. | ................ 70/34 X |
| 5,063,763 A | 11/1991 | Johnson | ........................ 70/58 |
| 5,284,038 A | 2/1994 | Johnson | ....................... 70/232 |
| 5,315,849 A | * 5/1994 | Georgopoulos | ................. 70/34 |
| 5,343,720 A | * 9/1994 | Slater | ............................. 70/14 |
| 5,540,065 A | 7/1996 | Wyers | ............................ 70/26 |
| 5,544,506 A | * 8/1996 | Nakano | ......................... 70/34 |
| 5,558,480 A | * 9/1996 | Kazino et al. | ............. 411/368 |
| 5,577,854 A | * 11/1996 | Jacob et al. | ................... 403/2 |
| 5,664,445 A | 9/1997 | Chang | ........................... 70/34 |
| 5,676,258 A | 10/1997 | Leyden et al. | ................. 211/7 |
| 5,857,817 A | * 1/1999 | Giannuzzi et al. | ............ 411/82 |
| 6,055,832 A | * 5/2000 | Wyers | ............................ 70/34 |

FOREIGN PATENT DOCUMENTS

| | | | | |
|---|---|---|---|---|
| DE | 24 25 386 A1 | 12/1975 | | |
| DE | 315 0783 | * 6/1983 | ................. | 280/507 |
| EP | 0 415 355 A2 | 3/1991 | | |
| GB | 1185746 | * 3/1970 | | |
| GB | 1209095 | * 10/1970 | ................. | 411/546 |
| GB | 2 248 650 A | 4/1992 | ................... | 70/34 |

* cited by examiner

Primary Examiner—Lloyd A. Gall
(74) Attorney, Agent, or Firm—Timothy J. Martin; Michael R. Henson; Rebecca A. Gegick

(57) ABSTRACT

A locking device includes a shackle member having a shank and a latch portion at one end and a stop at the other end. A locking head mounts in a locked state on the latch portion but is removable when unlocked. A sleeve is carried on the shank but is removable. The sleeve and the shank together define a size conversion structure for the shackle. When the sleeve is on the shank, the shackle has one operative thickness to closely fit one size aperture, but when the sleeve is removed, the shackle has another, smaller operative thickness to fit a smaller aperture. A retaining member may be employed to resist removal of the sleeve. Two or more sleeves may be used to fit more than two apertures. These can be separately mountable onto the shank or may be nested on the shank, one inside of the other.

27 Claims, 5 Drawing Sheets

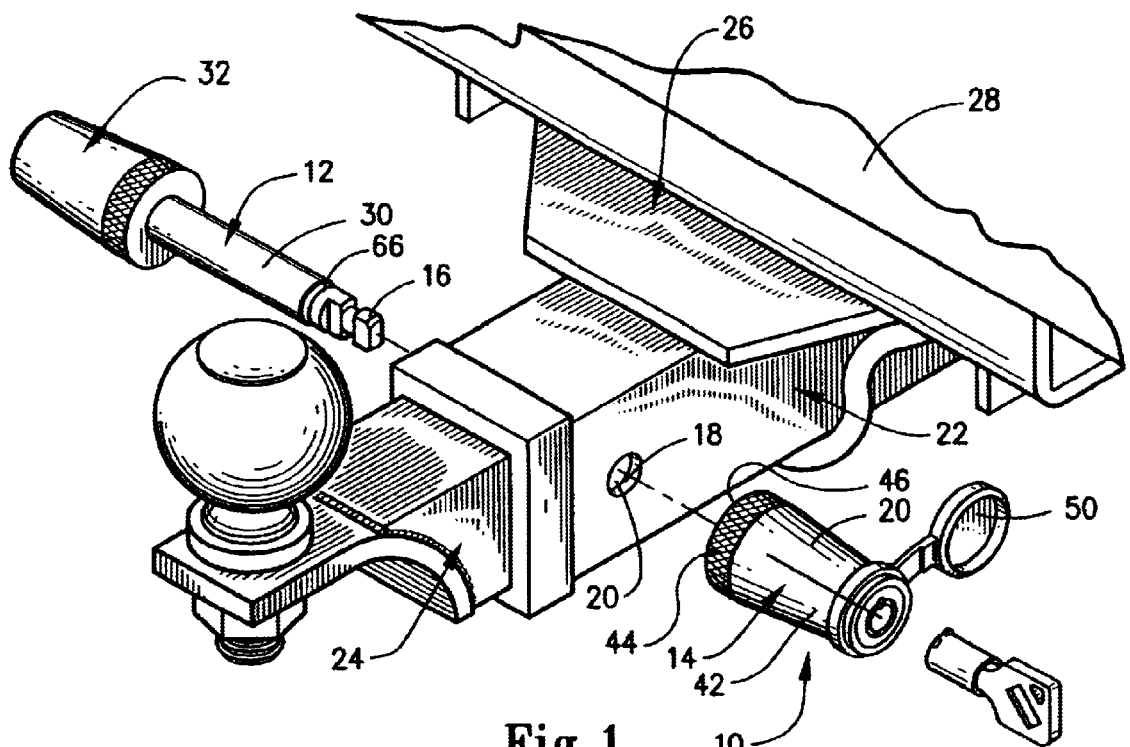
Fig.1
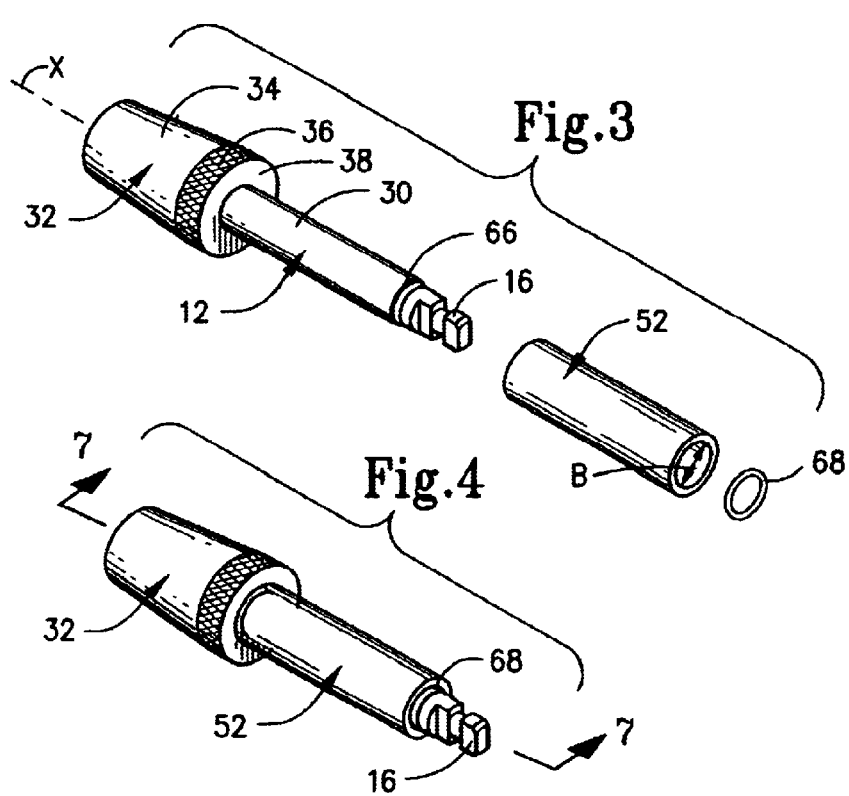
Fig.3
Fig.4

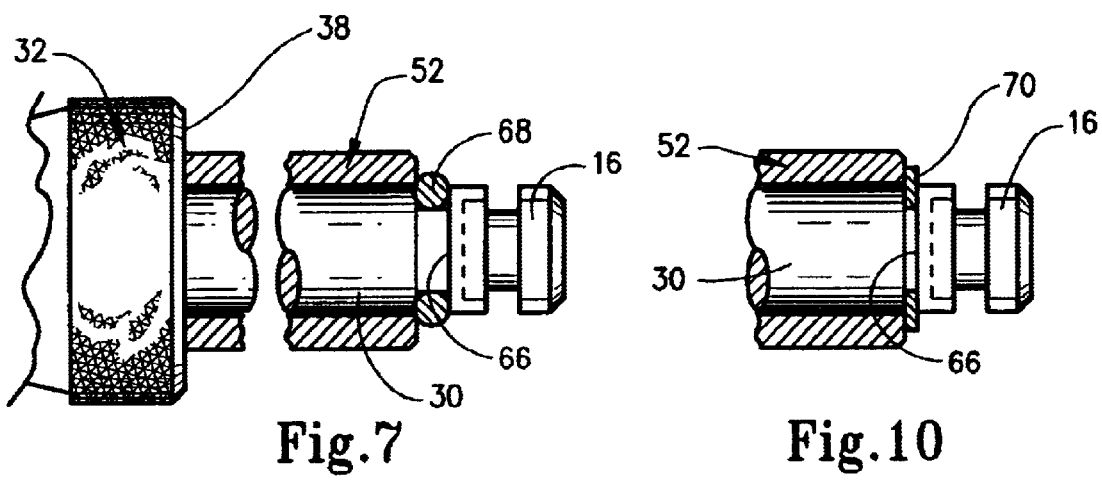
Fig. 7　　　　Fig. 10
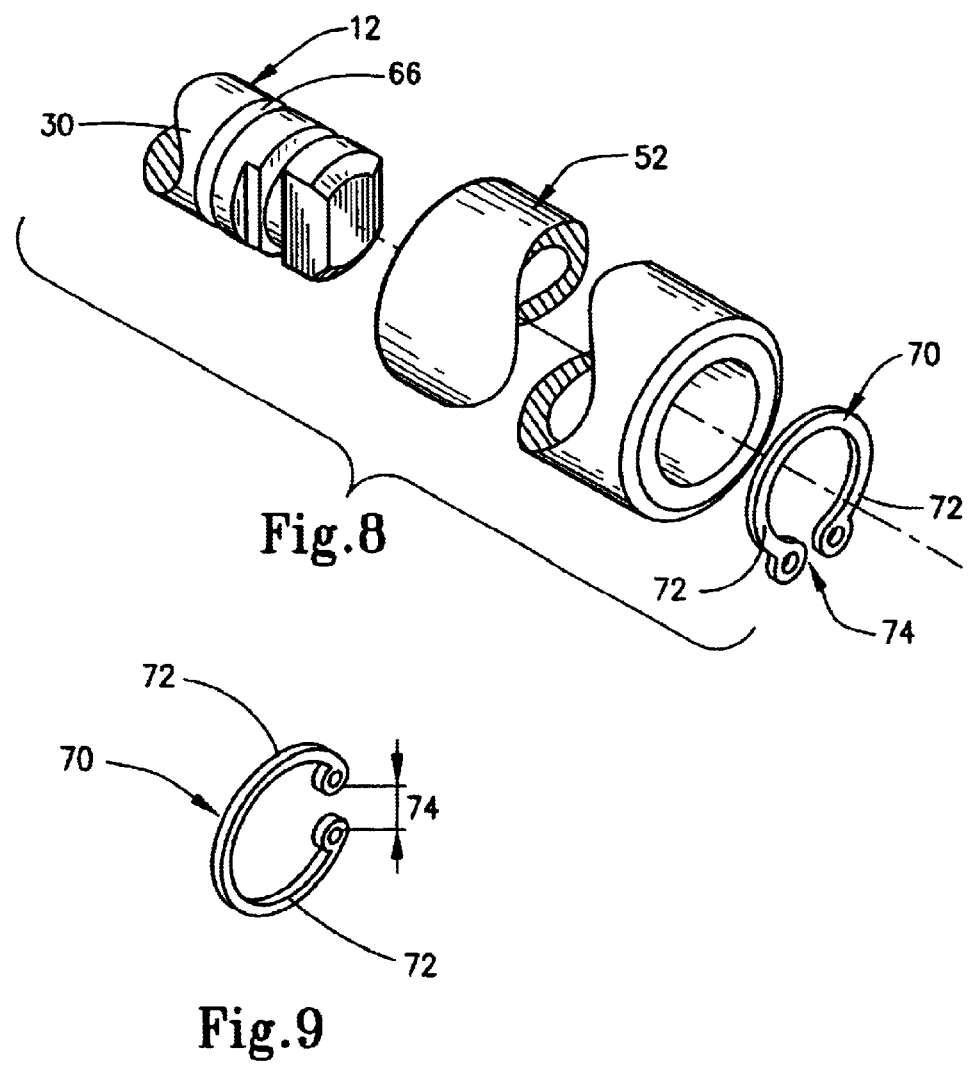
Fig. 8
Fig. 9

LOCKING DEVICE WITH CONVERTIBLE SHANK

RELATED APPLICATION

This application is related to U.S. patent application Ser. No. 09/153,511, filed Sep. 15, 1998, now U.S. Pat. No. 6,055,832 issued May 2, 2000, the contents of which are specifically incorporated herein.

FIELD OF THE INVENTION

The present invention broadly relates to locking devices that are adapted to secure objects together. More particularly, the present invention concerns key operable locking devices. Specifically, the present invention is directed to size adjustable locking shackles and shanks for such locking devices that, for example, may be used for towage applications, bicycles and the like.

BACKGROUND OF THE INVENTION

Over the years, there have been numerous variations of locking devices for a multitude of applications. Typically, a locking device is used to secure objects together, whether it be two independent items, a door for an enclosure, or the like. Moreover, a wide variety of locking mechanisms have been employed, including key actuated locks and combination locks, all of various constructions.

A widely used locking device is known as a padlock. The prior art padlock works adequately for a number of conventional applications wherein the span of objects to be secured is relatively short or where the span can be fitted with a hasp. However, numerous shortcomings of padlocks become apparent when a padlock is sought to be used in applications wherein two objects of thick cross-sections are to be secured. Examples of such conventional applications include those where telescopically joined round or square tubing members need to be secured together. Another example is where perpendicular or axially cross-bolting of gates and doors require a substantially rod-like locking device.

As a result of the need for rod or elongated shackle locking devices, various devices have been developed to penetrate multiple surfaces having aligned through bores for the purpose of securing those objects together. Once such example is found in U.S. Pat. No. 2,677,261 issued May 1954 to Jacobi. In the Jacobi patent, a complex locking device is taught in order to prevent actuation of a refrigerator door handle. Another example of a rod locking device is found in U.S. Pat. No. 4,576,021 issued Mar. 18, 1986 to Holden. Holden discloses a locking rod device having a rectangular locking head that is somewhat bulky and non-symmetrical. In the Holden locking device, a radially extendable locking pin engages a circumferential opening in the latch portion of the shackle in order to retain the shackle and locking head together. The bulky nature of this lock head design, however, makes it disadvantageous in use where only limited space is available.

Several additional types of straight shackle locks have been developed wherein the latched portion of the shackle is threadably received in a screw-type lock. Examples of these locks are described in U.S. Pat. No. 4,619,122 issued Oct. 28, 1986 to Simpson as well as in U.S. Pat. No. 4,711,106 issued Dec. 8, 1987 to Johnson. These types of locks, however, tend to be inconvenient and cumbersome to use due to the threaded nature of their locked mechanisms. Specifically, the key actuable locking head described in these two patents require a large number of key rotations in order to thread and fully secure the locking head portion onto the straight shackle. The inconvenience and difficulty of threaded lock systems is compounded when the lock is located in tight or difficult to access areas. Further, the threaded screw lock is especially prone to corrosion and seizure due to the small dimensioning of the threads.

Accordingly, there remains a need for improved locking structures of a rod or cable type nature that can effectively lock objects together. There is a need for such locking mechanisms to have suitable seals and protective structures to prevent ingress of unwanted substances, such as dirt and moisture, into the locking mechanism. There is a further need for locking structures that reduce the tendency for false locking conditions. These conditions are particularly true in the case of trailer hitch locks that utilize linear pins or shanks to connect a draw bar to the trailer hitch receiver inasmuch as these types of hitch locks are continuously exposed to dirt, soil, road grime and the like.

Consequently, my prior U.S. patent application referenced above is designed to meet the aforementioned situations and problems. However, as in the case of trailer hitch units and locks, there are a number of different size units available on the market depending on the size of the rig being towed. Moreover, there are numerous other lock applications which utilize linear pin and shank locks that incorporate shanks having different diameter sizes for different situations. As a result, a number of different locking devices having different sized shanks are needed to meet varied particular applications. This is cumbersome and expensive. Therefore, there is a need for a locking mechanism using a linear shank that is convertible for various applications. In this manner, a single locking unit may be used for a number of varied size locking requirements, such as where the apertures in the units to be connected and locked are varied from application to application.

SUMMARY OF THE INVENTION

It is an object of the present invention to provide a new and useful locking device that is simple in construction yet which provides a strong mechanical construction.

It is another object of the present invention to provide a locking structure which is convertible for use with different sized connecting openings.

It is yet another object of the present invention to provide a convertible locking structure which is adaptable in size for different connection openings.

Still another object of the invention is to provide variable mechanisms for maintaining the convertible state of the locking structure once it is selected.

A further object of the present invention is to provide a bolt-type locking structure having a pleasing, symmetrical appearance.

According to the present invention, then, a locking device is provided which is adapted to secure objects together. In its broad form, this locking device includes a shackle member having a shank terminating in first and second end portions. The shank is preferably linear. A latch portion is disposed at the shank first end portion and is configured to selectively engage a locking member. A stop portion is disposed at the shank second end portion. Finally, a sleeve is configured for selective engagement on the linear shank to vary the thickness dimension thereof. The locking device may in one preferred form be constructed to include a retaining member for selectively securing the sleeve in position on the shank.

In one preferred structure, the sleeve includes a plurality of sleeve elements each having a common inner diameter sized for mounting on the shank and each with a different outer diameter. Preferably, the sleeve includes three of such sleeve elements with each having a different outer diameter varying between ⅜ inch to ½ inch.

In another preferred structure, the sleeve includes a plurality of sleeve elements having variable outer diameters and configured to be selectively nested within each other. The innermost sleeve element of the nested sleeve elements is sized for mounting on the shank. In a preferred structure, the plurality of sleeve elements is in the form of three of such nested sleeve elements wherein a first sleeve element is sized for fitting onto the shank, the second sleeve element is sized for fitting onto the first sleeve element, and the third sleeve element is sized for fitting onto the second sleeve element.

In another preferred structure, the shank first end portion includes an annular groove therein proximate to the latch portion. The retaining member is in the form of a retention element configured for selective positioning within this annular groove to maintain the sleeve in position on the shank. This retaining element may take several constructions. In one form, the retention element is an annular O-ring disposed in said annular groove. In another form, the retention element is a C-shaped washer that has facing arm ends that define a gap therebetween for selective positioning in the annular groove.

In yet another preferred structure, the retaining member is in the form of a first set of threaded elements disposed on one end of the sleeve which are configured for threaded engagement with the stop portion. To accommodate this, it is preferred that the stop portion include an end portion which has a second set of threaded elements disposed therein and which are configured to receive and engage the first set of threaded elements disposed on the sleeve. Finally, the sleeve and the shank may have a common linear length between the stop portion and the latch portion.

These and other objects of the present invention will become more readily appreciated and understood from a consideration of the following detailed description of the exemplary embodiments when taken together with the accompanying drawings, in which:

BRIEF DESCRIPTION OF THE DRAWINGS

FIG. 1 is an exploded perspective view of a locking device according to a first exemplary embodiment of the invention to be used to lockably interconnect a draw bar to a trailer hitch receiver;

FIG. 3 is an exploded perspective view of the shackle member of the locking device shown in FIG. 1 with one embodiment of the size conversion device of the invention;

FIG. 4 is a perspective view of the shackle member shown in FIG. 3;

FIG. 7 is an enlarged cross-sectional view taken substantially about lines 7—7 of FIG. 4 and particularly illustrating one retaining embodiment of the invention;

FIG. 8 is an enlarged, exploded perspective view of one end portion of the shackle member of the locking device shown in FIG. 1 illustrating a second retaining embodiment of the invention;

FIG. 9 is an enlarged perspective view of a C-clip construction which may be used as a retaining member in the embodiment illustrated in FIG. 8;

FIG. 10 is an enlarged cross-sectional view similar to FIG. 7 but illustrating the second retaining embodiment of FIGS. 8–9;

DETAILED DESCRIPTION OF THE EXEMPLARY EMBODIMENTS

The present invention is directed to a locking device that is adapted to secure objects together. The locking device is broadly that of my related U.S. Patent Application referenced above and preferably includes a key operable locking head that axially mates, through an axial opening thereof, with a shackle member. An axially insertable key rotates a locking core in the locking head in order to rotate a retainer that engages and releases a locking head on a latch portion of the shackle member. While the shackle member may take a variety of configurations, the present invention is particularly useful as a receiver lock that may be employed to secure a draw bar, sometimes also referred to as a hitch barora tow bar, to a trailer hitch receiver. However, the present invention may also be used as a coupler lock, as a watercraft lock, cross bolt gate lock, spare tire lock, bike carrier lock, a cable lock and any other similar locking structure. It should be understood that any number of different kinds of lock configurations and types may be used with the present invention. Some specific examples of these are illustrated in the above referenced patents. Accordingly, the present invention is not to be limited to any particular kind of locking head design or operation.

Figure 2:
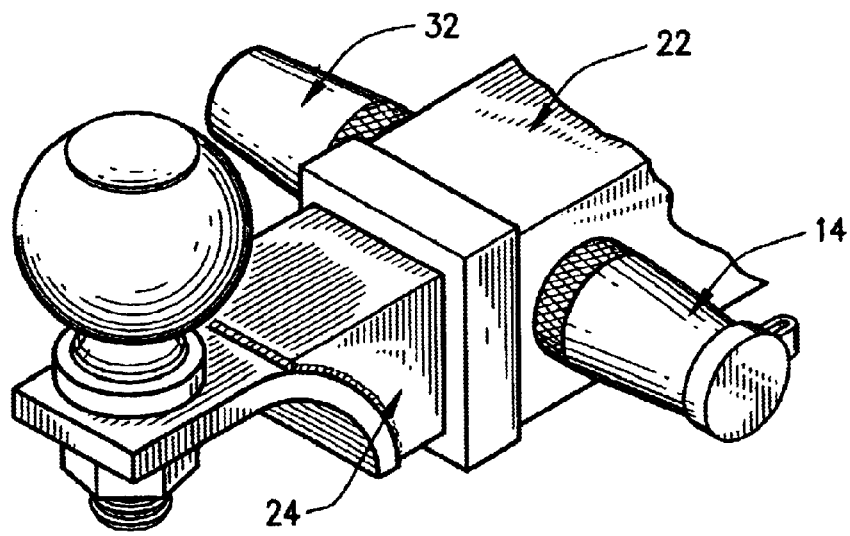
FIG. 2 is a perspective view of the locking device shown in FIG. 1 but in a secured state interconnecting the tow bar and trailer hitch receiver.

The exemplary embodiments of the present invention are shown in FIGS. 1–14, where like reference numbers refer to like parts. With reference first to FIG. 1, it may be seen that a locking device 10 includes a shackle member 12 and a key operable locking head 14 which may receive a latch portion 16 of the shackle member 12 to define a fastened state, as is shown in FIG. 2. In FIGS. 1 and 2, the locking device 10 is shown to be constructed as a receiver lock which may extend through the aligned bores 18 and 20 of a receiver 22 and a hitch or tow bar 24, respectively. The receiver 22, of course, is secured to a frame 26, for example, in the underside of a vehicle 28. It should be understood, however, that the description of the present locking device 10 is not intended to be limited to a receiver lock, with such construction being provided for illustration purposes only.

With reference now to FIGS. 3–6, 11 and 12, it may be seen that shackle member 12 preferably includes an elongated linear portion that is in the form of an elongated shank 30 that has a central axis "X". The latch portion 16 is disposed at a first end of shank 30 with a stop portion 32 being disposed at a second end of shank 30 opposite the latch portion 16. The stop portion 32 may be of any desired or known shape or configuration including a knob, a bent rod, an angular extension of the shank 30, a dumbbell, and the like. Preferably, the stop portion or member 32 is preferably formed as an enlarged knob that is generally frustoconical in shape so that it is symmetrical with locking head 14, as is clearly shown in the various Figures.

The stop portion 32 preferably includes an outer surface 34 and an annular circumferential end surface 36. The stop portion 32 has a diameter dimension that is larger than the outer diameter dimension of the cylindrical shank 30. An annular shoulder 38 at the end surface 36 forms an inner rim for the stop portion 32. Suitable knurling, if desired, may be formed on the side wall surface 36 proximate to the shoulder 38 for enhancing finger grip capability. Preferably, the latch portion 16, the shank 30 and the stop portion 32 are formed as an integral one-piece construction, for example, of a suitable forged steel. Alternatively, the stop portion 32 may be suitably affixed to the shank 30 in any convenient manner that is not readily removable should the integrity of locking device 10 be attacked.

Figure 11:
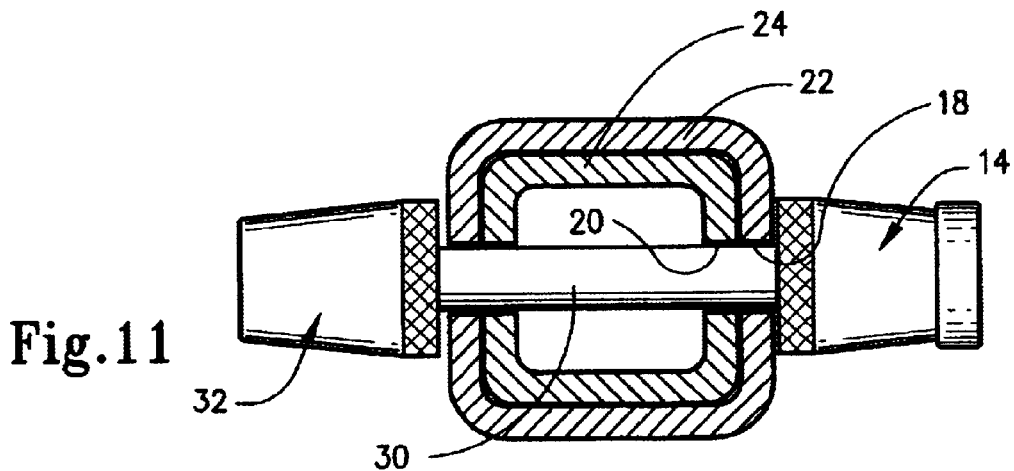
FIG. 11 is a side view in elevation of the locking device shown in FIG. 1, in a secured state, with the tow bar and trailer hitch receiver shown in cross-section.
Figure 12:
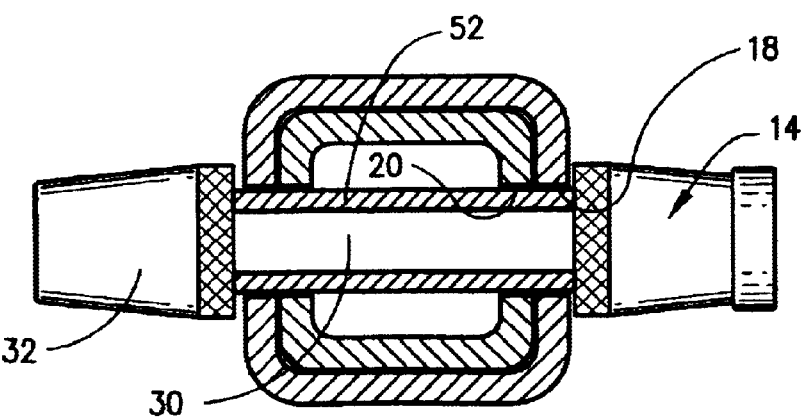
FIG. 12 is a side view in elevation substantially similar to that of FIG. 11 but illustrating the placement and use of the size conversion device of FIG. 3.

The locking head 14 is best shown in FIGS. 1, 2, 11 and 12. Here, it may be seen that the locking head 14 includes a housing 40 that is preferably formed to have a similar shape as the stop portion 32 so that the shackle member 30 and the locking head 14 present a substantially symmetrical appearance when in the fastened state as shown in FIGS. 2, 11 and 12. Accordingly, the housing 40 is generally frustoconical in shape having an outer sidewall surface 42 and an annular circumferential end surface 44. An annular shoulder 46 at the end 44 forms an inner rim, and knurling, if desired, may be formed on the outer surface 44 proximately to shoulder 46. A plastic cap element 50 is provided that clips over the key end of the locking head 14 in order to provide protection against environmental elements, as described in my previously referenced prior patent application. It should be noted, however, that any type of appropriate locking mechanism may be used with the present invention as the locking head 14 so long as it is adapted to engage with the latch portion 16 of the shank 30. Accordingly, further details thereof will not be discussed herein.

Referring now with particularity to FIGS. 1, 2, 11 and 12, it can be appreciated that the diameter dimension of the shank 30 is sized to fit within the apertures 18, 20 of the two units 22, 24 to be interconnected. Unfortunately, there is little uniformity in aperture size dimensions for trailer hitch arrangements let alone other types of locking devices as discussed above. Therefore, prior to the present invention, a number of different sized shackle members 12 along with their accompanying locks and other components have been required to meet the varying size dimension demands of the consumer market. The present invention obviates these requirements.

Referring now particularly to FIGS. 3, 4, 11 and 12, the shank 30 has a set diameter dimension "A". In the prior art, these typically have ranged from 3/8"–5/8", with the 5/8" and 1/2" sizes being the most popular. Shanks having a 7/16" diameter are also used, but less frequently. In accordance with the preferred embodiment of the present invention, the diameter "A" of the shank 30 is preferably the smallest commonly used size, or 3/8". When the apertures 18, 20 of the units 22, 24 are this size, then the shackle 12 as illustrated in FIG. 3 is used by itself and results in the locked connection illustrated in FIG. 11. However, if the apertures 18, 20 are larger than this dimension, then the sleeve 52 of the present invention is utilized to accommodate for the larger openings or apertures.

In a preferred embodiment, the sleeve 52 may be in the form of a metal tube sized and shaped to slidingly fit over the shank 30. Alternatively, the sleeve 52 may be made from a hard plastic material such as polyurethane or polyethylene. While a metal sleeve 52 provides greater strength and durability, a plastic sleeve 52 cushions the device 10, reduces rattle noise and eliminates surface scratching.

Preferably, the inner diameter dimension "B" of the sleeve 52 is just slightly larger than the outer dimension "A" of the shank 30 so that the sleeve 52 will snugly slide or telescope over the shank 30 to provide a new, larger outer diameter as described below. In the preferred embodiment, the sleeve 52 has a linear length that is the same as the linear length of the shank 30 between the shoulder 38 and the latch portion 16. In this manner, the sleeve will snugly fit between the stop portion 32 and the locking head 14 once the sleeve 52 is mounted over the shank 30 and the unit inserted through the apertures 18, 20 as illustrated in FIG. 12. In this manner, one sleeve member 52 will enable the locking device 10 of the invention to be used with the two most common sized trailer hitch arrangements.

Figure 5:
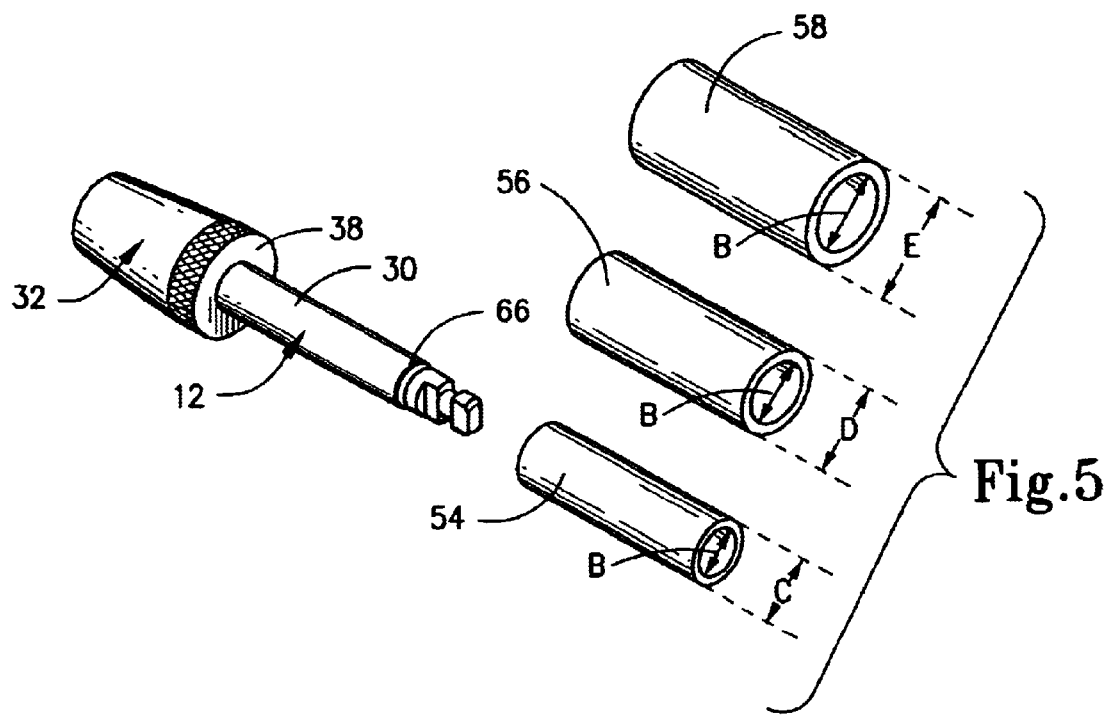
FIG. 5 is an exploded perspective view of the shackle member of the locking device shown in FIG. 1 illustrating one preferred embodiment of the size conversion device of the present invention.
Figure 6:
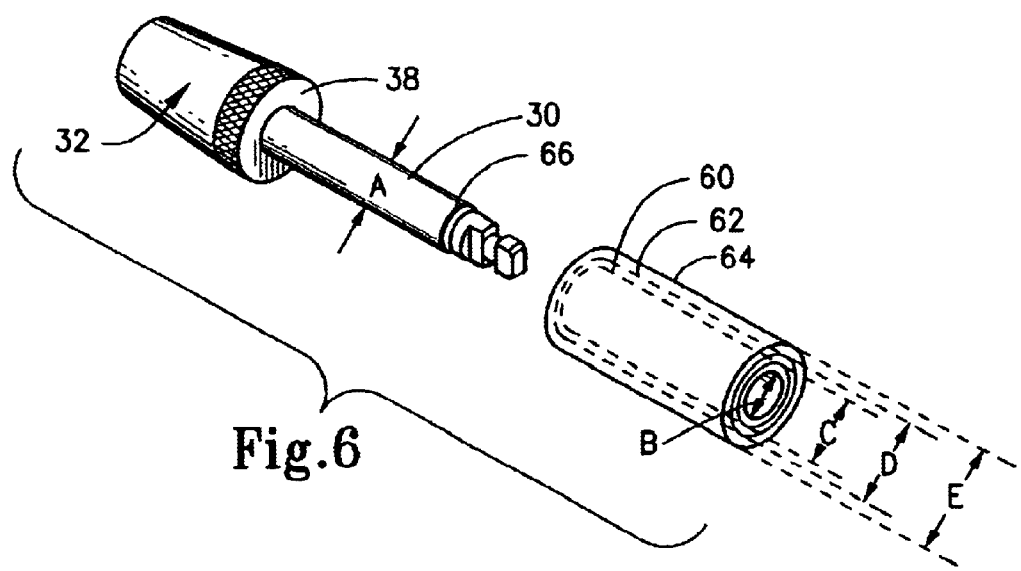
FIG. 6 is an exploded perspective view, with parts in shadow, of the shackle member of the locking device shown in FIG. 1 illustrating a second embodiment of the size conversion device of the present invention.

Referring now to FIGS. 5 and 6, the sleeve 52 of the present invention may take the form of several embodiments. The sleeve 52 was described above as a single sleeve element. As noted previously, however, there are several predominant sized aperture combinations for shackle-type locks, and these are. typically 3/8", 7/16", 1/2" and 5/8". Therefore, one preferred embodiment of the invention for the sleeve 52 includes a set of at least two and preferably three sleeve elements 54, 56 and 58 as illustrated in FIG. 5. The three sleeve elements 54–58 all have a common inner diameter dimension "B" for snug fitting over the shank 30 which, as previously mentioned, is preferably about 3/8". However, each of the sleeve elements 54, 56 and 58 have a different outer diameter dimension "C", "D", and "E" corresponding, preferably, to 7/16", 1/2" and 5/8". It should be understood, however, that these specific dimensions are for illustrative purposes only and that the invention is not to be in any way limited to these dimensions or combinations thereof.

As a result of the above, a single locking device 10 having a single shackle 12 and lock head 14 can be used in any number of different situations where the apertures 18, 20 are of various different sizes . This is accomplished by simply determining which size sleeve element 52 is needed to fit the apertures 18, 20 and then slipping the appropriate sleeve 52 onto and over the shank 30.

In an alternative embodiment as illustrated in FIG. 6, the sleeve 52 may be in the form of a set of at least two and preferably three stacked and nested sleeve elements 60, 62 and 64. In this instance, the inner diameter and outer diameter dimensions of each of the sleeve elements 60–64 are different. The inner diameter of the first sleeve element 60 is "B" as initially shown in FIG. 3 so that it may readily mount onto the shank 30. However, the outer diameter of the first sleeve 60 and the inner diameter of the second sleeve 62 are substantially the same, i.e. "C". There is a slight difference so that the second sleeve element 62 can be slidingly mounted over the first sleeve element 60. In this manner, the combination of the two sleeve elements 60, 62 can be mounted onto the shank 30 and adjust the diameter dimension of the shackle member 12 to another larger size for connecting through yet another sized set of apertures 18, 20. Finally, the inner diameter of the third sleeve element 64 is approximately the same as the outer diameter of the second sleeve element 62, that is "D", so that it may slidingly mount over the second sleeve element 62. In this manner, one may choose to use none, one, two or all three of the nested sleeve elements 60, 62 and 64 to adjust the diameter dimension of the shackle 12 for desired connections depending on the sizes of the apertures 18, 20.

Regardless of which sleeve 52 combination (FIGS. 5 and 6) one chooses to use, a retaining apparatus is utilized to assist in maintaining the sleeve 52 in position on the shank 30. Referring first to FIGS. 3 and 7–10, an annular groove 66 is disposed in the first end portion of the shank 30 proximate but inside the latch portion 16. In one form of the invention, an O-ring 68 may be placed in the groove 66 once the sleeve 52 is positioned over the shank 30. The O-ring is sized so that it acts as a stop member against the first end portion of the sleeve 52 to hold it in abutting position against the stop portion shoulder 38 as illustrated in FIG. 7. Depending on the thickness of the sleeve 52 (reference FIGS. 5 and 6), the O-ring should be dimensioned accordingly. It should also be understood that the annular groove 66 may be formed to have a cross-section that is either U-shaped or square-shaped. The square-shaped groove 66 tends to hold the O-ring 68 more firmly therein as compared to a U-shaped groove 66. However, the U-shaped groove 66 enables one to more easily move the O-ring into and out of the groove 66 to permit easier changing of the sleeve 52.

Alternatively, and as illustrated in FIGS. 8–10, a C-shaped washer 70 may be utilized in the groove 66. In preferred form, the washer 70 has a pair of facing arms 72 that have free ends which define a gap 74 therebetween. The gap 74 is sized to engage the groove 66. Accordingly, the C-shaped washer 70 seats in the groove 66 of shank 30 to define a stop for the sleeve 52 mounted on the shank 30 as described above for the O-ring 68.

Figure 13:
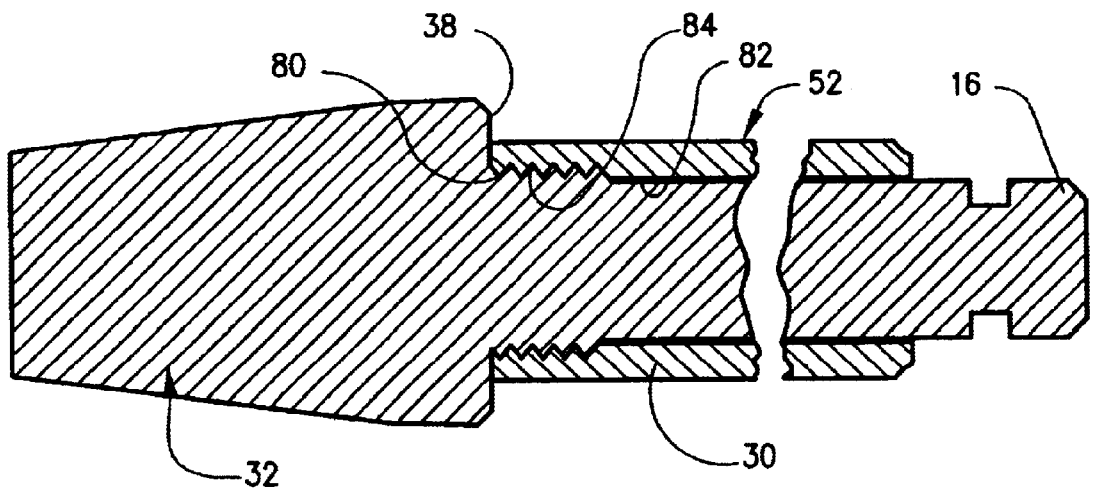
FIG. 13 is an enlarged cross-sectional view of the locking device of the present invention but illustrating another sleeve retaining embodiment for the size conversion device of the present invention.
Figure 14:
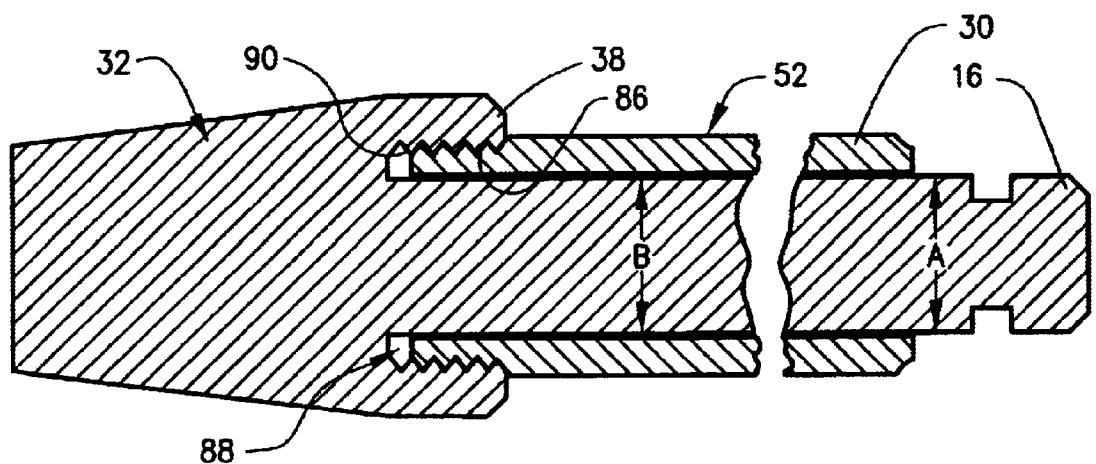
FIG. 14 is an enlarged cross-sectional view substantially similar to that of FIG. 13 but illustrating yet another embodiment of the sleeve retaining embodiment of the invention.

In an alternate embodiment of the invention, the retaining apparatus may take another form other than that illustrated in FIGS. 7–10. Referring to FIGS. 13 and 14, the stop portion 32 may be modified to act as the retaining mechanism in conjunction with the sleeve 52. In one form illustrated in FIG. 13, the end portion of the stop member 32 in the form of the second end of the shank 30 adjacent the shoulder 38 is modified to include a set of threads 80. Likewise, the inner surface 82 of the sleeve 52 includes a set of threads 84 proximate one end thereof. In this manner, when the sleeve 52 is slidingly mounted over the shank 30, the sleeve 52 is rotated to engage the first and second sets of threads 80, 84 to securely fasten the sleeve 52 onto the shank 30.

Referring to FIG. 14, another modified version of the retaining apparatus is shown. In this embodiment, a set of threads 86 are disposed onto the outer end surface of the sleeve 52 rather than the inner surface as in the previous embodiment. In addition, the end portion of the stop member 32 is modified to include an annular channel 88 formed into the shoulder 38. A set of threads 90 are disposed on the radially outer surface of the channel 88 and are adapted to engage the set of threads 86 when the sleeve 52 is mounted onto the shank 30. In this manner, the sleeve 52 is firmly maintained in position on the shank 30.

Of course, it should also be appreciated by the ordinarily skilled artisan that other mechanisms can be provided to accomplish the retention of the sleeve onto the shackle. For example, the present invention contemplates that the sleeve can be retained on the shackle member merely by means of a close friction fit engagement, since when the locking device is in the assembled state securing two components together, the sleeve is necessarily sandwiched between the locking head and the stop. Alternatively, spring ball assemblies could be provided to provide for appropriate engagement between the selected sleeve and the shackle member, and particularly the stop portion. Even further, appropriate mechanisms could be provided so that the sleeve is adapted to releasably clip to the stop that is defined on the shank of the locking device. Accordingly, these examples are only representative to illustrate that a variety of techniques could be employed to accomplish the retention of the sleeve over the shank 30, and the ordinarily skilled artisan should appreciate that the present, invention should not unnecessarily be confined to the illustrative examples discussed herein.

From the foregoing, it should be appreciated that a variety of different constructions of locking devices and dimension adjustment and conversion mechanisms therefor are within the ambient of the present invention. For example, the diameter and length of linear shank 30 may be varied to suit the particular needs of a locking device. Thus, the locking devices according to the present invention may be used as receiver locks, coupler locks and the like. Indeed, virtually any type of shackle configuration is within the scope of the present invention so long as it has an axially insertable latch portion which will mate with a locking head in combination with a shackle member having an adjustable diameter to meet the needs of different sized connection unit apertures. Moreover, it will be understood, as previously discussed, that any type of locking head as well as stop member construction, operation and/or configuration may be utilized with the present invention, and the invention shall not be confined or limited in any way by the locking head and stop member embodiments illustrated herein.

It will be appreciated that the device of the present invention enables an individual to utilize a key locking device in any number of situations where the size of the articles being locked along with the size of the locking apertures provided therein are varied, yet the same locking device may be used by simply adjusting the diameter of the shackle thereof using the present invention. Moreover, different sleeve constructions and combinations are possible while still providing the shank diameter variability capabilities of the invention.

Accordingly, the present invention has been described with some degree of particularity directed to the exemplary embodiments of the present invention. It should be appreciated, though, that the present invention is defined by the following claims construed in light of the prior art so that modifications or changes may be made to the exemplary embodiment of the present invention without departing from the inventive concepts contained herein.

I claim:

1. A locking device adapted for insertion into first and second apertures having different sizes, comprising:
   (a) a shackle member having a shank terminating in first and second ends;
   (b) a locking head movable between a locked state and an unlocked state;
   (c) a latch portion disposed at the first end of said shank and configured to selectively engage said locking head;
   (d) a stop portion disposed at the second end of said shank;
   (e) a sleeve removably disposed and carried on said shank when in an engaged position such that said shank and said sleeve together define a size conversion structure for said shackle, said size conversion structure having one operative thickness dimension for insertion into one of said first and second apertures when said sleeve is in the engaged position and another operative thickness dimension smaller than said one operative thickness dimension for insertion into another of said first and second apertures when said sleeve is removed from said shank: and (f) a retaining member independent of said locking head for releasably securing said sleeve on said shank.

2. A locking device according to claim 1, including a set of at least two sleeve elements each having a common inner diameter sized for mounting on said shank and each with a different outer diameter.

3. A locking device according to claim 2, wherein said shank has an outer diameter of about ⅜", and wherein said size conversion structure includes a set of three sleeve elements each with a different outer diameter varying between ⁷⁄₁₆" to ⅝".

4. A locking device according to claim 1, including a set of at least two sleeve elements having variable outer diameters and configured to be selectively nested within each other, the innermost sleeve element of said nested sleeve elements being sized for mounting on said shank.

5. A locking device according to claim 4, wherein said size conversion structure includes a set of three said nested sleeve elements including a first sleeve element sized for close-fitting yet removable engagement with said shank, a second sleeve element sized for close-fitting yet removable engagement with said first sleeve element, and a third sleeve element sized for close-fitting yet removable engagement with said second sleeve element.

6. A locking device according to claim 1, wherein said shank has a first end portion that includes an annular groove formed therein proximate said latch portion, and wherein said retaining member comprises a retention element disposed in said annular groove to maintain said sleeve in position on said shank.

7. A locking device according to claim 6, wherein said retention element is an annular O-ring disposed in said annular groove.

8. A locking device according to claim 1 wherein said shank is linear and wherein said sleeve and said shank have a common linear length between said stop portion and said latch portion.

9. A locking device according to claim 1, wherein said sleeve is constructed from a material selected from the group consisting of polyurethane and polyethylene to provide a cushioning effect to said device along with reduced noise.

10. A convertible locking device comprising:

(a) a locking head movable between a locked and an unlocked state;

(b) a shackle member including a size conversion structure defined by a shank with a thickness dimension and first and second end portions and a plurality of sleeve elements for selective removable coupling to said shank to vary the thickness dimension thereof;

(c) a latch portion disposed at said shank first end portion and configured to engage said locking head;

(d) a stop member disposed at said shank second end portion; and (e) a retaining apparatus for selectively securing said sleeve elements in position, on said shank.

11. A locking device according to claim 10, wherein each of said sleeve elements has a common inner diameter sized for mounting on said shank and each with a different outer diameter.

12. A locking device according to claim 10, wherein said sleeve elements each have different inner and outer diameters and wherein said sleeve elements are configured to be selectively nested within each other in a radially stacked relationship, an innermost sleeve element of said nested sleeve elements being sized for mounting on said shank.

13. A locking device according to claim 12, wherein said set of sleeve elements comprise three said nested sleeve elements including a first sleeve element sized for close-fitting engagement with said shank, a second sleeve element sized for close-fitting engagement with said first sleeve element, and a third sleeve element sized for close-fitting engagement with said second sleeve element.

14. A locking device according to claim 10, wherein said retaining apparatus comprises an annular groove disposed in said shank first end portion and a retention element configured for selective positioning within said annular groove to maintain one or more of said sleeve elements of said plurality of sleeve elements in position on said shank.

15. A locking hitch pin device for interconnecting a hitch bar with a hitch receiver, said bar and receiver each including apertures disposed therein for receiving the hitch pin device, said device comprising:

(a) a hitch pin shank having first and second end portions and a thickness dimension;

(b) a latch portion disposed at said first end portion;

(c) a locking head member movable between locked and unlocked states and configured for selective engagement with said latch portion;

(d) a stop member disposed at said second end portion;

(e) a sleeve for selective engagement with said hitch pin shank to selectively vary the thickness dimension thereof to match the size diameter of the hitch bar and the receiver apertures to permit snug engagement therewith; and (f) a retaining apparatus operative to resist removal of said sleeve from said hitch pin shank when said locking head member is in the unlocked state and removed from said latch portion.

16. A looking device according to claim 15, wherein said retaining apparatus comprises an annular groove disposed in said hitch pin shank first end portion and a retention element configured for selective positioning within said annular groove to maintain said sleeve in position on said hitch pin shank.

17. A locking device according to claim 16, wherein said device includes a set of at least two sleeve elements each having an inner diameter sized for mounting on said hitch pin shank and each with a different outer diameter to match varying sized bar and receiver apertures, said retention element selectively maintaining each said sleeve element in position on said hitch pin shank.

18. A locking device according to claim 16, wherein said device includes a set of at least two sleeve elements having variable inner and outer diameters and configured to be selectively nested within each other, the innermost sleeve element of said nested sleeve elements being sized for close-fitting engagement with said hitch pin shank, said retention element selectively maintaining one or more of said sleeve elements in nested position on said hitch pin shank.

19. A locking device adapted for alternative close-fitted insertion within a first aperture having a first diameter and a second aperture having a second diameter larger than the first diameter, comprising:

(A) a shackle member including
 (1) a cylindrical shank having a shank diameter of a first selected size for mated engagement with the first aperture such that said shank may be inserted into and removed from the first aperture
 (2) a latch portion located at a first end portion of said shank and
 (3) a stop portion located at a second end portion of said shank;
(B) a locking head configured to selectively engage said latch portion to define a mounted state and movable between a locked state wherein said locking head is lockably secured to said shackle and an unlocked state wherein said locking head is removable from said shackle;
(C) a sleeve formed as a cylindrical shell having an inner diameter sized and adapted for close-fitted yet removable telescopic engagement on said shank and a larger, outer diameter of a selected size for close-fitted, mated engagement with the second aperture, said sleeve operative when received on said shank such that said shank and sleeve may be inserted together into and together removed from the second aperture.

20. A locking device according to claim 19 including a retaining element operative to resist removal of said sleeve from said shank when said locking head is in the unlocked state and removed from said latch portion.

21. A locking device adapted for close-fitted, alternative insertion within first and second apertures having different sizes, comprising:
 (a) a shackle member having a shank portion;
 (b) a locking head movable between a locked state and an unlocked state;
 (c) a latch portion disposed at said shank first end portion and configured to selectively engage said locking head;
 (d) a stop portion disposed at said shank second end portion; and
 (e) a sleeve carried on said shank such that said shank and said sleeve together provide said shackle with one operative thickness dimension for close-fitted insertion within one of said first and second apertures, said sleeve being removable from said shank such that said shackle has another operative thickness dimension smaller than said one operative thickness dimension for close-fitted insertion within another of said first and second apertures said sleeve operative when received on said shank such that said shank and said sleeve may be inserted together into and together removed from said one of said first and second aperatures.

22. A locking device according to claim 21 including a retaining element operative to resist removal of said sleeve from said shank portion when said locking head is in the unlocked state and removed from said latch portion.

23. A locking hitch system comprising:
 (A) a first hitch bar and a first hitch receiver, said first hitch bar and said first hitch receiver each including first apertures of a first size disposed therein and aligned for registration with one another;
 (B) a second hitch bar and a second hitch receiver, said second hitch bar and said second hitch receiver each including second apertures of a first size disposed therein and aligned for registration with one another, said first apertures being smaller than said second apertures;
 (C) a convertible hitch pin including:
  (1) a hitch pin shank having first and second ends and a shank outer dimension sized and adapted for close-fitted engagement with the first apertures;
  (2) a latch portion disposed at said first end;
  (3) a stop member disposed at said second end;
  (4) a sleeve for selective engagement with said hitch pin shank and having an outer dimension sized and adapted for close-fitted engagement with the second apertures; and
 (D) a locking head member movable between locked and unlocked states and configured for selective engagement with said latch portion.

24. A locking device adapted for insertion into first and second apertures having different sizes, comprising:
 (a) a shackle member having a shank terminating in first and second ends, said shank having a length between the first and second ends;
 (b) a locking head movable between a locked state and an unlocked state;
 (c) a latch portion disposed at the first end of said shank and configured to selectively engage said locking head;
 (d) a stop portion disposed at the second end of said shank; and
 (e) a sleeve removably disposed and carried on said shank when in an engaged position with said sleeve having a sleeve length such that, when in the engaged position, said sleeve extends over a majority of the length of said shank, said shank and said sleeve together defining a size conversion structure for said shackle, said size conversion structure having one operative thickness dimension for insertion into one of said first and second apertures when said sleeve is in the engaged position and another operative thickness dimension smaller than said one operative thickness dimension for insertion into another of said first and second apertures when said sleeve is removed from said shank.

25. A locking device according to claim 24, wherein said device further comprises a retaining member independent of said locking head for releasably securing said sleeve on said shank.

26. A locking device according to claim 25, wherein said retaining member comprises a compressible, resilient element engaging said shank and said sleeve when said sleeve is in the engaged position.

27. A locking device according to claim 24 wherein the length of said shank and the sleeve length are substantially the same.

* * * * *